(12) United States Patent
Johnson

(10) Patent No.: US 9,888,765 B2
(45) Date of Patent: Feb. 13, 2018

(54) SYSTEM OF RETRACTABLE SHELVES

(71) Applicant: Walter L Johnson, East Point, GA (US)

(72) Inventor: Walter L Johnson, East Point, GA (US)

( * ) Notice: Subject to any disclaimer, the term of this patent is extended or adjusted under 35 U.S.C. 154(b) by 0 days.

(21) Appl. No.: 15/384,040

(22) Filed: Dec. 19, 2016

(65) Prior Publication Data

US 2017/0096294 A1    Apr. 6, 2017

Related U.S. Application Data

(63) Continuation-in-part of application No. PCT/IB2016/050127, filed on Jan. 12, 2016, which is a continuation-in-part of application No. 14/595,967, filed on Jan. 13, 2015, now Pat. No. 9,198,509.

(60) Provisional application No. 61/932,665, filed on Jan. 28, 2014.

(51) Int. Cl.
| | |
|---|---|
| *A47B 5/06* | (2006.01) |
| *B62D 63/08* | (2006.01) |
| *B65D 90/00* | (2006.01) |
| *B60P 1/02* | (2006.01) |

(52) U.S. Cl.
CPC ............... *A47B 5/06* (2013.01); *B60P 1/02* (2013.01); *B62D 63/08* (2013.01); *B65D 90/0053* (2013.01); *B65D 90/0073* (2013.01)

(58) Field of Classification Search
CPC .... A47B 5/00; A47B 5/04; A47B 5/06; B65D 90/0053; B65D 90/004; B65D 90/0073; B65D 90/0066; B62D 63/08; B60P 1/02

USPC .......................... 296/174; 108/179, 127, 128
See application file for complete search history.

(56) References Cited

U.S. PATENT DOCUMENTS

| | | | | |
|---|---|---|---|---|
| 198,454 | A * | 12/1877 | French | A47B 43/00 108/176 |
| 253,081 | A * | 1/1882 | McKenzie | A47G 25/0685 211/104 |
| 1,688,533 | A * | 10/1928 | Eger | B25H 1/04 144/285 |
| 2,677,588 | A * | 5/1954 | Couse | A47B 37/00 108/15 |
| 3,427,667 | A * | 2/1969 | Ratcliff | A47B 5/00 5/3 |

(Continued)

FOREIGN PATENT DOCUMENTS

DE    102008015757 B3 * 12/2009 ........... B65D 88/121

*Primary Examiner* — Michael Safavi

(57) ABSTRACT

The retractable shelf system allows for the compartmentalization of storage container. The system is integrated into the interior space of the storage container and includes a plurality of shelving units distributed along the length of the storage container.

Each shelving unit includes a first retractable shelf and a second retractable shelf. The first retractable shelf and the second retractable shelf each include a storage panel, a support beam, a hinge mechanism, and an at least one support leg. The support beam from each retractable shelf is mounted parallel and offset to each other within the storage container. The storage panel is mounted adjacent to the support beam by the hinge mechanism. The support leg is hingedly connected to a bottom surface of the support storage panel, opposite the support beam. The first retractable shelf and the second retractable shelf can be positioned into a retracted configuration and a functional configuration.

10 Claims, 4 Drawing Sheets

(56) References Cited

U.S. PATENT DOCUMENTS

| | | | | |
|---|---|---|---|---|
| 4,005,898 | A * | 2/1977 | Way | B60P 3/34 |
| | | | | 108/117 |
| 6,212,710 | B1 * | 4/2001 | Jones | B60P 3/38 |
| | | | | 296/170 |
| 6,758,514 | B1 * | 7/2004 | Walkden | B62D 33/02 |
| | | | | 296/165 |
| 6,994,034 | B2 * | 2/2006 | Chang | A47B 21/00 |
| | | | | 108/115 |
| 8,857,892 | B1 * | 10/2014 | Shockley | B60P 3/341 |
| | | | | 296/169 |
| 9,359,015 | B2 * | 6/2016 | Evans | E05D 5/0238 |
| 2009/0026211 | A1 * | 1/2009 | Maresh | B65D 90/0073 |
| | | | | 220/533 |
| 2009/0249982 | A1 * | 10/2009 | Palethorpe | A47B 5/00 |
| | | | | 108/44 |
| 2016/0333619 | A1 * | 11/2016 | Jaworski | E05D 11/1014 |

* cited by examiner

SYSTEM OF RETRACTABLE SHELVES

The current application is a continuation in part of PCT Application PCT/IB2016/050127 filed Jan. 12, 2016 which claims priority to U.S. patent application Ser. No. 14/595, 967 filed Jan. 13, 2015. The current application is further a continuation in part of U.S. patent application Ser. No. 14/595,967 filed Jan. 13, 2015 which claims benefit of U.S. Provisional patent application 61/932,665 filed on Jan. 28, 2014.

FIELD OF THE INVENTION

The present invention relates generally to automotive accessories. More specifically, the present invention is a series of shelving units for a truck drawn trailer or other similar storage unit which compartmentalize the storage space with increased efficiency as well aid in expediting the mechanical handling of materials during loading and unloading processes.

BACKGROUND OF THE INVENTION

Tobacco is an agricultural product from the *Nicotiana* genus, a popular commodity around the world. Once processed, tobacco can be consumed and used in medicine or pesticide composition. Conversely, the most popular use for tobacco is in the form of a drug. Tobacco contains a stimulant called alkaloid nicotine which temporarily improves either mental or physical functions or both. Tobacco smoking is one of the more prominent means of absorbing the stimulant in to the body in today's society. Tobacco smoking is the process of burning tobacco and inhaling the resultant smoke; various forms of smoking include cigars, cigarettes, and pipes. Flavor, strength, and quality are all determined by the quality and type of the tobacco leaves used. Generally, the geographic vicinity, tobacco sort, and manufacturing processes all play a major role in determining the quality of the smoke. Additionally, a major component that is crucial to the quality of tobacco leaves is the storage and transportation methods. Tobacco leaves are very sensitive to moisture and liquid substances which give off pungent or penetrating odors. In wet and or humid conditions tobacco leaves begin to absorb the water yielding conditions that are perfect for mold growth and subsequent fermentation; this leads to a lower quality product.

Unmanufactured tobacco leaves are traditionally transported in large containers such as 20 or 40 foot trailers in the form of large bales. The size and carrying capacity of such bales are limited due to the sensitive nature of the tobacco leaves. Various precautions are taken to prevent the leaves from fermenting, breaking, or altering in anyway. Precautions include temperature and humidity control, weather proof trailers, surface covers under the bales, and bale size limitations. Larger bale size lead to humidity differences between the leaves in the center and the outer perimeter, if the bale size exceeds a certain size mold will begin to grow in the inner layers of the bale. Additionally, because of the delicate nature of the leaves, bales cannot be stacked on top of each other which lead to a single level of bales distributed about the floor of the storage/transportation container leaving a substantial amount of space within the container empty. The present invention allows for containers to carry more than one layer of product, doubling the efficiency of the process; and saving money, effort, and time.

DETAIL DESCRIPTIONS OF THE INVENTION

All illustrations of the drawings are for the purpose of describing selected versions of the present invention and are not intended to limit the scope of the present invention.

The present invention is a retractable shelving unit for a storage container 13 such as a truck drawn trailer or other similar storage unit. A multitude of units may be utilized to cover all the interior space of a storage container 13. More specifically, the present invention is a system which alters the storage container 13 by dividing the interior space to accommodate individual shipments of materials such as bales of tobacco leaves. The present invention provides a flexible compartment configuration as each separate unit may be retracted to modify the interior space according to the needs of the user. Additionally, the retractable nature of each shelf of the system allows for progressive loading and unloading of individual shipments of materials.

Figure 3:
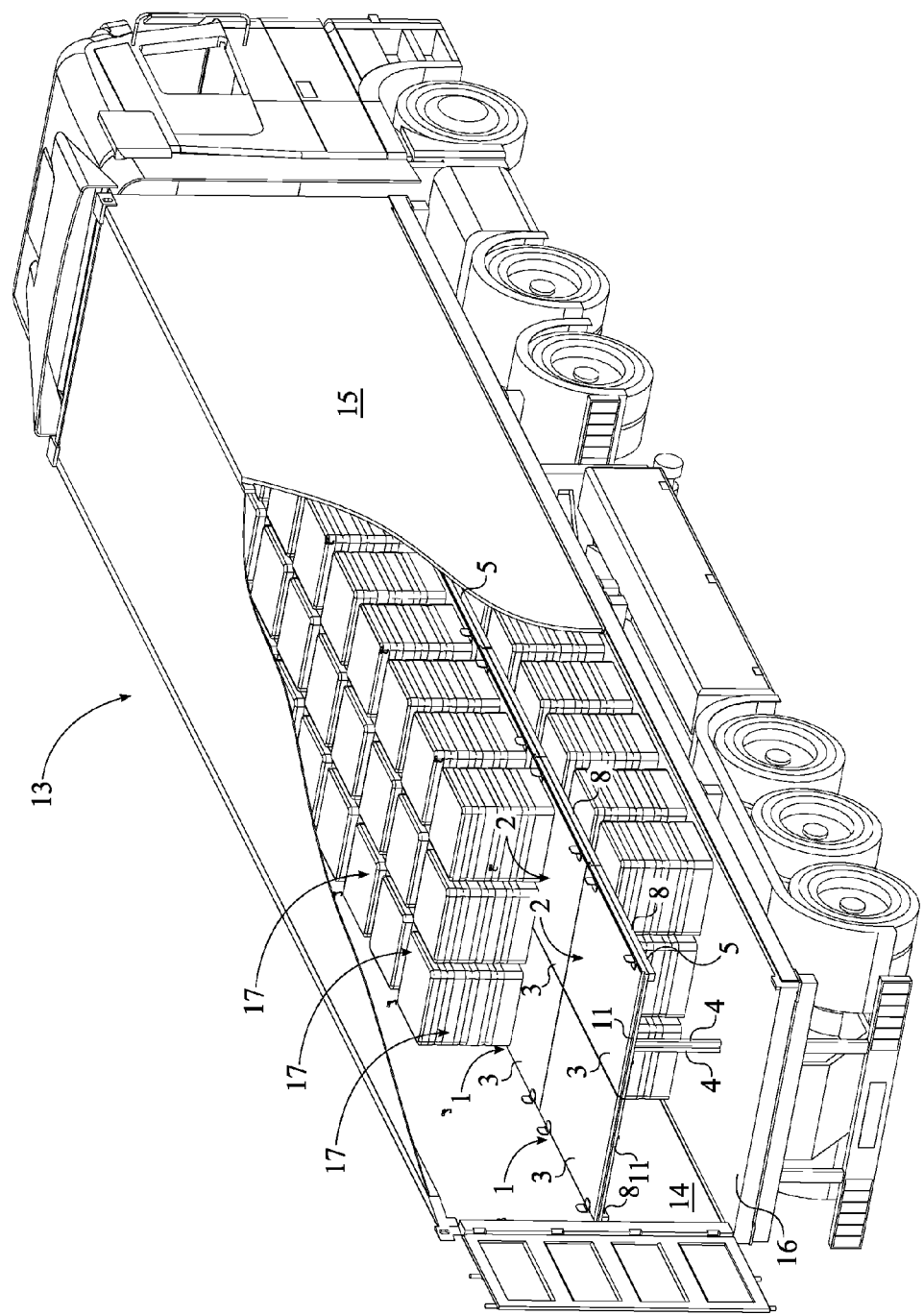
FIG. 3 is an internal perspective view of a plurality of shelving units within a storage container.

Referring to FIG. 3, the present invention comprises a plurality of shelving units 17. The present invention is integrated into the storage container 13 in order to compartmentalize the interior space. The present invention may be integrated into a variety of storage container 13 types including, but not limited to, truck bodies, individual trailers, storage pods, and freight containers to mention a few of non-limiting examples. Each of the plurality of shelving units 17 is a pair of shelves that may be positioned to hold additional freight within the storage container 13. The plurality of shelving units 17 provides an additional level of storage within the storage container 13.

Figure 1:
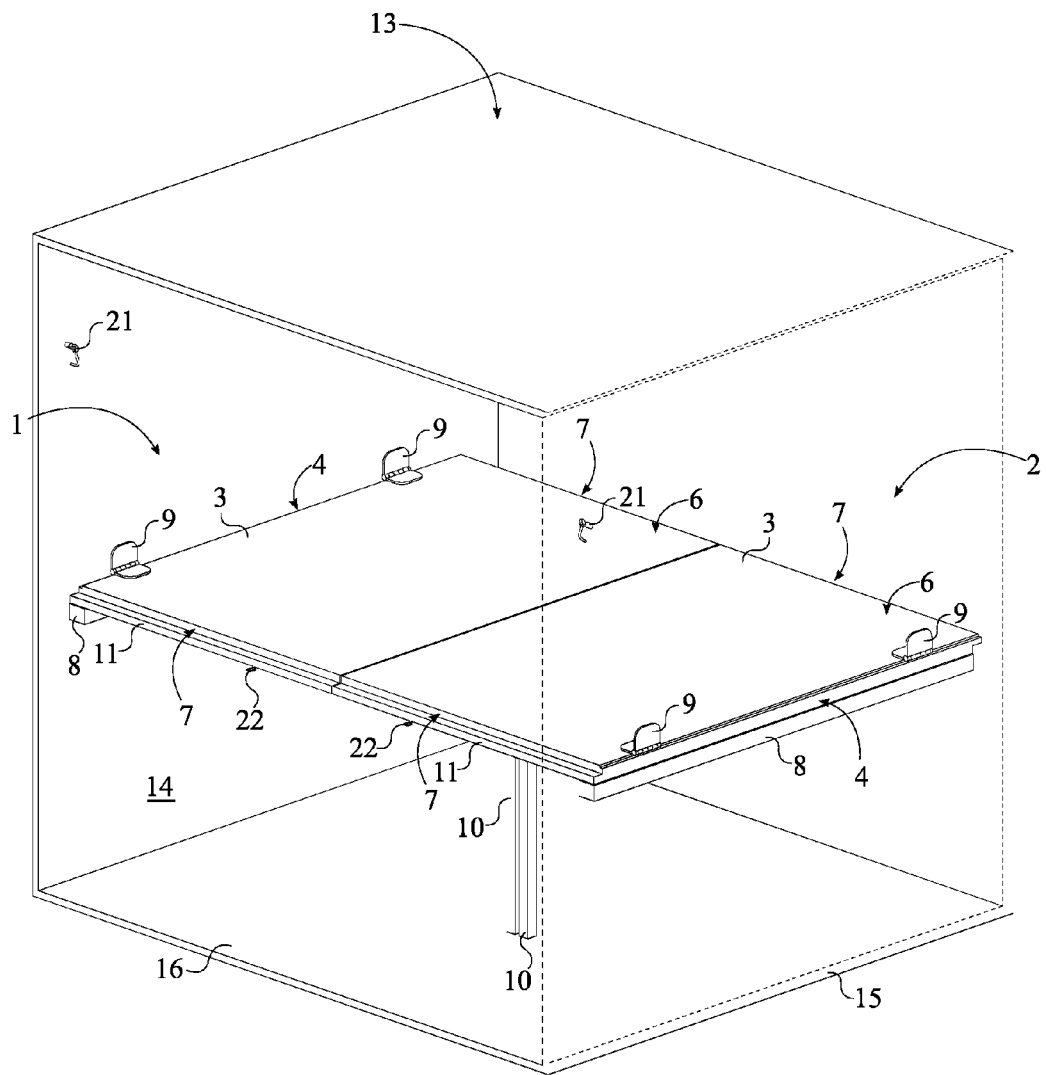
FIG. 1 is a perspective view of a shelving unit within a storage container in the functional configuration.

Referring to FIG. 3, each of the plurality of shelving units 17 comprises a first retractable shelf 1 and a second retractable shelf 2. For simplicity purposes, a single unit from the plurality of shelving units 17 is described hereafter unless stated otherwise. The first retractable shelf 1 and the second retractable shelf 2 are identical components that are mirrored within the storage container 13 as seen in FIG. 1. In particular, the first retractable shelf 1 and the second retractable shelf 2 each comprise a storage panel 3, a support beam 8, a hinge mechanism 9, and an at least one support leg 10. The storage panel 3 acts as a flat storage space onto which freight may be placed upon as seen in FIG. 3. The support beam 8 runs along the storage container 13 and provides vertical support to the storage panel 3, thus bearing a portion of the weight from the stored freight. More specifically, the support beam 8 of the first retractable shelf 1 and the support beam 8 of the second retractable shelf 2 are mounted parallel and offset to each other. Thus, the first retractable shelf 1 and the second retractable shelf 2 are oriented towards each other as seen in FIG. 1. The hinge mechanism 9 allows the storage panel 3 to rotated relative to the support beam 8. In particular, the hinge mechanism 9 is mounted along the support beam 8 with the storage panel 3 being positioned adjacent to the hinge mechanism 9 and the support beam 8. A first edge 4 of the storage panel 3 acts as a rotation axis for the storage panel 3. This is achieved by the first edge 4 being connected to the hinge mechanism 9, thus allowing the storage panel 3 to rotate. Resultantly, the first retractable shelf 1 and the second retractable shelf 2 each can be positioned into a retracted configuration and a functional configuration, depicted in FIG. 1 and FIG. 2.

The support leg 10 provides additional vertical support for the storage panel 3, ensuring structural rigidity when freight is stored and transferred using the present invention. To ensure adequate perimetric support for the storage panel 3, the support leg 10 and the support beam 8 are positioned opposite to each other across the storage panel 3. Additionally, the support leg 10 is hingedly connected to a bottom surface 5 of the storage panel 3. Thus, in the retracted configuration, the support leg 10 folds against the storage panel 3 to reduce the overall profile of the present invention. The storage panel 3 of the first retractable shelf 1 and the storage panel 3 of the second retractable shelf 2 are oriented parallel to each other to yield a symmetric design for the shelving unit 17.

Furthermore, the storage panel 3 comprises a pair of lateral edges 7. The pair of lateral edges 7 are perpendicularly positioned with the first edge 4, yielding a rectangular and thus modular shape for the storage panel 3. For the most efficient use of space within the storage container 13, it is important that the there is no space in between two adjacent units 17 from the plurality of shelving units 17. This is achieved by aligning the first retractable shelf 1 with the second retractable shelf 2 within each shelving unit 17. More specifically, the pair of lateral edges 7 for the storage panel 3 of the first retractable shelf 1 is aligned colinearly/flush with the pair of lateral edges 7 for the storage panel 3 of the second retractable shelf 2.

Figure 4:
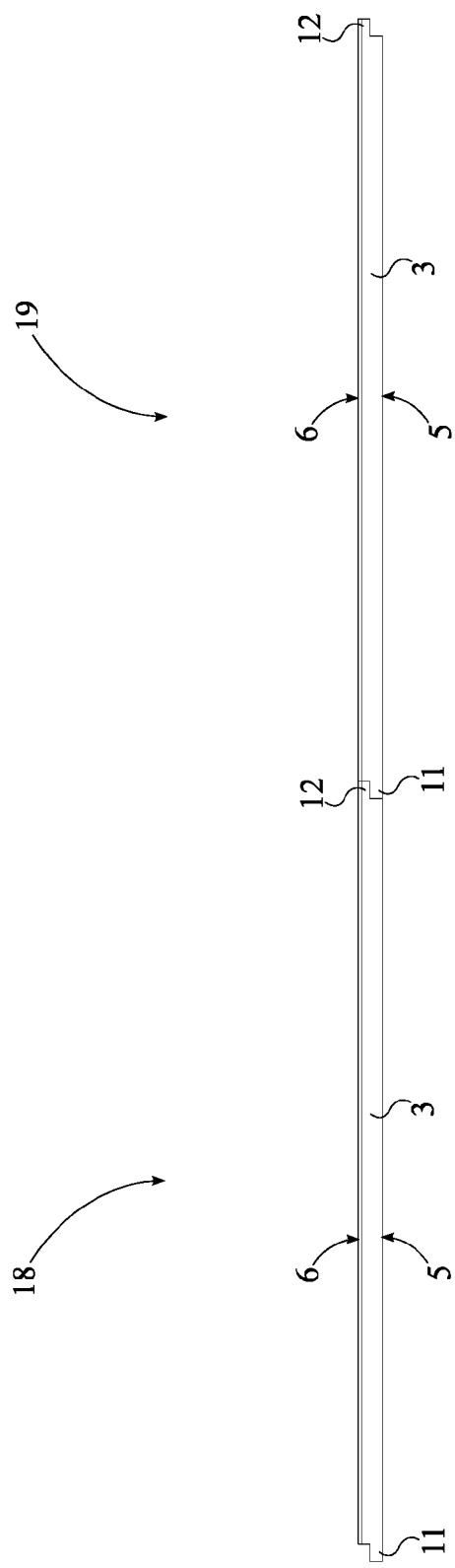
FIG. 4 is a side-view of the storage panels from an arbitrary unit and an adjacent unit depicting the engagement between the two storage panels.

Referring to FIG. 4, the first retractable shelf 1 and the second retractable shelf 2 each further comprises a first interlocking lip 11 and a second interlocking lip 12. The first interlocking lip 11 and the second interlocking lip 12 allow the first retractable shelf 1 and the second retractable shelf 2 from two adjacent shelving units 17 to mechanically engage with each other and provide additional vertical support. The first interlocking lip 11 and the second interlocking lip 12 are positioned opposite to each other across the storage panel 3. Additionally, the first interlocking lip 11 and the second interlocking lip 12 are oriented perpendicular to the first edge 4, i.e. positioned along the pair of lateral edges 7 of the storage panel 3. The first interlocking lip 11 and the second interlocking lip 12 are adjacently connected to the storage panel 3. Furthermore, the first interlocking lip 11 is positioned flush with the bottom surface 5 of the storage panel 3. The second interlocking lip 12 is positioned flush with a top surface 6 of the storage panel 3. The first interlocking lip 11 and the second interlocking lip 12 are shaped and sized complimentary to each other as seen in FIG. 4.

Referring to FIG. 3, one of the main objectives of the present invention is to compartmentalize the interior space of the storage container 13 to accommodate the storage needs of individual shipments of material. The storage container 13 comprises at least the following components: a first sidewall 14, a second sidewall 15, and a floor 16.

Each of the shelving units 17 engages said components of the storage container 13 but it is understood that additional components of the storage container 13 may also exist including, but not limited to, a ceiling, a door(s), and a front wall. More specifically, the plurality of shelving units 17 is serially and evenly distributed along the storage container 13 in order to create a secondary storage level within the storage container 13. For each shelving unit 17, the support beam 8 of the first retractable shelf 1 is connected along the first sidewall 14. Complimentary, the hinge mechanism 9 of the first retractable shelf 1 is connected to the first sidewall 14. The support beam 8 of the second retractable shelf 2 is connected along the second sidewall 15, opposite the support beam 8 of the first retractable shelf 1. Complimentary, the hinge mechanism 9 of the second retractable shelf 2 is connected to the second sidewall 15.

The plurality of shelving units 17 may span the full length or partial length of the storage container 13, depending on the needs of the user. If used to the full length of the storage container 13, the present invention essentially doubles the possible resting surface of the storage container 13. In one embodiment of the present invention, a single pair of rails is used to support the first retractable shelf 1 and the second retractable shelf 2 within each of the plurality of shelving units 17. In particular, the pair of rails replaces the support beam 8 for the first retractable shelf 1 and the support beam 8 for the second retractable shelf 2 from each of the plurality of shelving units 17. The pair of rails is mounted within the storage container 13 in place of the support beam 8 for the first retractable shelf 1 and the support beam 8 for the second retractable shelf 2.

Figure 2:
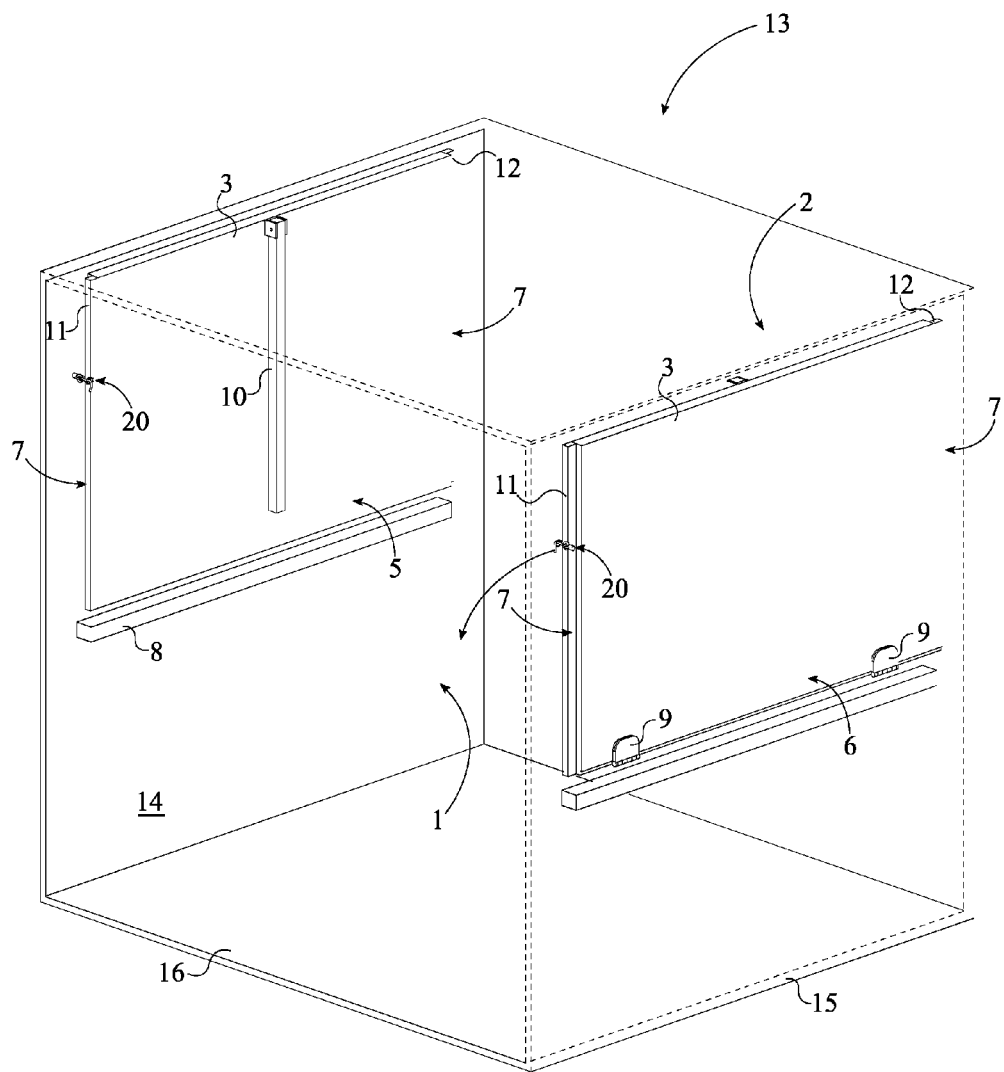
FIG. 2 is a perspective view of a shelving unit within a storage container in the retracted configuration.

Referring to FIG. 2, the first retractable shelf 1 and the second retractable shelf 2 can each be positioned into the retracted configuration in order to provide the user with the traditional space offered by the storage container 13. In the retracted configuration, the first retractable shelf 1 is secured against the first sidewall 14. More specifically, the storage panel 3 of the first retractable shelf 1 is positioned adjacent and parallel to the first sidewall 14. Additionally, the support leg 10 of the first retractable shelf 1 is positioned adjacent and parallel to the storage panel 3 of the first retractable shelf 1 in order to further decrease the overall profile of the first retractable shelf 1. In the retracted configuration, the second retractable shelf 2 is secured against the second sidewall 15. More specifically, the storage panel 3 of the second retractable shelf 2 is positioned adjacent and parallel to the second sidewall 15. Additionally, the support leg 10 of the second retractable shelf 2 is positioned adjacent and parallel to the storage panel 3 of the second retractable shelf 2 in order to further decrease the overall profile of the second retractable shelf 2.

In one embodiment, the first retractable shelf 1 and the second retractable shelf 2 each further comprise a locking mechanism 20. The locking mechanism 20 is used to secure the first retractable shelf 1 and/or the second retractable shelf 2 in the retracted configuration. The locking mechanism 20 comprises a first locking element 21 and a second locking element 22. The first locking element 21 is mounted offset to the hinge mechanism 9, opposite the support beam 8. More specifically, for the first retractable shelf 1, the first locking element 21 is adjacently connected to the first sidewall 14. Complimentary, the second locking element 22 is connected to the storage panel 3 of the first retractable shelf 1. Similarly, the first locking element 21 of the second retractable shelf 2 is adjacently connected to the second sidewall 15. The second locking element 22 of the second retractable shelf 2 is connected to the storage panel 3 of the second retractable shelf 2.

When the first retractable shelf 1 and the second retractable shelf 2 are positioned into the retracted configuration, the first locking element 21 is mechanically engaged to the second locking element 22 to secure said configuration as seen in FIG. 2. A variety of devices may be used for the locking mechanism 20. In the preferred embodiment of the present invention, the locking mechanism 20 is a hook-and-eye lock wherein the first locking element 21 is a pivoting hook and the second locking element 22 is a ring.

Referring to FIG. 1, the first retractable shelf 1 and the second retractable shelf 2 can each be positioned into the functional configuration in order to allow the user to expand the storage space within the storage container 13. In the functional configuration, referring to the first retractable shelf 1, the storage panel 3 of the first retractable shelf 1 is positioned perpendicular to the first sidewall 14. The support leg 10 of the first retractable shelf 1 acts as a vertical support and is positioned normal to the storage panel 3, pressing against the floor 16. In the functional configuration, referring to the second retractable shelf 2, the storage panel 3 of the second retractable shelf 2 is positioned perpendicular to the second sidewall 15. The support leg 10 of the second retractable shelf 2 acts as a vertical support and is positioned normal to the storage panel 3, pressing against the floor 16.

Referring to FIG. 4, when the first retractable shelf 1 and the second retractable shelf 2 from each of the plurality of shelving units 17 are positioned into the functional configuration, the second interlocking lip 12 of the first retractable shelf 1 from an arbitrary unit 18 is mechanically engaged to the first interlocking lip 11 of the first retractable shelf 1 from an adjacent unit 19; the arbitrary unit 18 may be any unit from the plurality of shelving units 17 and the adjacent unit 19 is the unit from the plurality of shelving units 17 that is directly next to the arbitrary unit 18. Similarly, the second interlocking lip 12 of the second retractable shelf 2 from the arbitrary unit 18 is mechanically engaged to the first interlocking lip 11 of the second retractable shelf 2 from the adjacent unit 19. Additionally, an interconnecting beam is connected to a front sidewall of the storage container 13 which supports a front unit from the plurality of shelving units 17. In particular, the interconnecting beam is adjacently connected to the front sidewall, oriented perpendicular to the first sidewall 14 and the second sidewall 15. For the front unit, the first interlocking lip 11 of the first retractable shelf 1 and the second retractable shelf 2 are both mechanically engaged to, i.e. pressed onto, the interconnecting beam.

Although the invention has been explained in relation to its preferred embodiment, it is to be understood that many other possible modifications and variations can be made without departing from the spirit and scope of the invention as hereinafter claimed.

What is claimed is:

1. A system of retractable shelves comprises:
    a storage container;
    a plurality of shelving units;
    each of the plurality of shelving units comprises a first retractable shelf and a second retractable shelf;
    the first retractable shelf and the second retractable shelf each comprise a storage panel, a support beam, a hinge mechanism, and an at least one support leg;
    the plurality of shelving units being serially and evenly distributed along the storage container;
    the support beam of the first retractable shelf and the support beam of the second retractable shelf being mounted within the storage container;
    the support beam of the first retractable shelf and the support beam of the second retractable shelf being positioned parallel and offset to each other;
    the hinge mechanism being mounted along the support beam;
    the storage panel being positioned adjacent to the hinge mechanism and the support beam;
    a first edge of the storage panel being connected to the hinge mechanism;
    the support leg and the support beam being positioned opposite to each other across the storage panel;
    the support leg being hingedly connected to a bottom surface of the storage panel; and
    the storage panel of the first retractable shelf and the storage panel of the second retractable shelf being oriented parallel to each other, wherein the first retractable shelf and the second retractable shelf moves in between a retracted configuration and a functional configuration.

2. The system of retractable shelves as claimed in claim 1 comprises:
    the storage panel comprises a pair of lateral edges;
    the pair of lateral edges being perpendicularly positioned with the first edge; and
    the pair of lateral edges for the storage panel of the first retractable shelf being aligned with the pair of lateral edges for the storage panel of the second retractable shelf.

3. The system of retractable shelves as claimed in claim 1 comprises:
    the first retractable shelf and the second retractable shelf being oriented towards each other.

4. The system of retractable shelves as claimed in claim 1 comprises:
    the first retractable shelf and the second retractable shelf each further comprises a first interlocking lip and a second interlocking lip;
    the first interlocking lip and the second interlocking lip being positioned opposite to each other across the storage panel;
    the first interlocking lip and the second interlocking lip being oriented perpendicular to the first edge;
    the first interlocking lip being positioned flush with the bottom surface of the storage panel;
    the second interlocking lip being positioned flush with a top surface of the storage panel; and
    the first interlocking lip and the second interlocking lip being adjacently connected along the storage panel.

5. The system of retractable shelves as claimed in claim 1 comprises:
    the storage container comprises a first sidewall, a second sidewall, and a floor;
    the support beam of the first retractable shelf being connected along the first sidewall;
    the support beam of the second retractable shelf being connected along the second sidewall, opposite of the support beam of the first retractable shelf;
    the hinge mechanism of the first retractable shelf being connected to the first sidewall; and
    the hinge mechanism of the second retractable shelf being connected to the second sidewall.

6. The system of retractable shelves as claimed in claim 5 comprises:
    wherein the first retractable shelf and the second retractable shelf of an arbitrary unit from the plurality of shelving units is arranged into the retracted configuration;
    the storage panel of the first retractable shelf of the arbitrary unit being positioned adjacent and parallel to the first sidewall;
    the storage panel of the second retractable shelf of the arbitrary unit being positioned adjacent and parallel to the second sidewall;

the support leg of the first retractable shelf of the arbitrary unit being positioned adjacent and parallel to the storage panel of the first retractable shelf of the arbitrary unit; and the support leg of the second retractable shelf of the arbitrary unit being positioned adjacent and parallel to the storage panel of the second retractable shelf of the arbitrary unit.

7. The system of retractable shelves as claimed in claim 6 comprises:

the first retractable shelf and the second retractable shelf each further comprise a locking mechanism;

the locking mechanism comprises a first locking element and a second locking element;

the first locking element being mounted offset to the hinge mechanism, opposite the support beam;

the first locking element of the first retractable shelf being adjacently connected to the first sidewall;

the second locking element of first retractable shelf being connected to the storage panel of the first retractable shelf;

the first locking element of the second retractable shelf being adjacently connected to the second sidewall;

the second locking element of second retractable shelf being connected to the storage panel of the second retractable shelf;

the first locking element of the first retractable shelf of the arbitrary unit being mechanically engaged to the second locking element of the first retractable shelf of the arbitrary unit; and the first locking element of the second retractable shelf of the arbitrary unit being mechanically engaged to the second locking element of the second retractable shelf of the arbitrary unit.

8. The system of retractable shelves as claimed in claim 7 comprises:

the first locking element being a pivoting hook; and the second locking element being a ring.

9. The system of retractable shelves as claimed in claim 5 comprises:

wherein the first retractable shelf and the second retractable shelf of an arbitrary unit from the plurality of shelving units is arranged into the functional configuration;

the storage panel of the first retractable shelf of the arbitrary unit being positioned perpendicular to the first sidewall;

the storage panel of the second retractable shelf of the arbitrary unit being positioned perpendicular to the second sidewall;

the support leg of the first retractable shelf of the arbitrary unit being positioned normal to the storage panel of the first retractable shelf of the arbitrary unit;

the support leg of the first retractable shelf of the arbitrary unit being pressed against the floor;

the support leg of the second retractable shelf of the arbitrary unit being positioned normal to the storage panel of the second retractable shelf of the arbitrary unit; and the support leg of the second retractable shelf of the arbitrary unit being pressed against the floor.

10. The system of retractable shelves as claimed in claim 9 comprises:

the plurality of shelving units comprises an adjacent unit;

a second interlocking lip of the first retractable shelf of the arbitrary unit being mechanically engaged to a first interlocking lip of the first retractable shelf from the adjacent unit; and a second interlocking lip of the second retractable shelf from the arbitrary unit being mechanically engaged to a first interlocking lip of the second retractable shelf from the adjacent unit.

* * * * *